(12) United States Patent
Whiteside et al.

(10) Patent No.: US 10,560,450 B2
(45) Date of Patent: Feb. 11, 2020

(54) ALGORITHM HARDENING IN BACKGROUND CONTEXT AND EXTERNAL FROM THE BROWSER TO PREVENT MALICIOUS INTERVENTION WITH THE BROWSER

(71) Applicant: McAfee, LLC, Santa Clara, CA (US)

(72) Inventors: Greg Whiteside, Montreal (CA); Olivier Beaulieu, Montreal (CA); Mathieu Rene, Montreal (CA)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/985,382

(22) Filed: May 21, 2018

(65) Prior Publication Data

US 2018/0270218 A1    Sep. 20, 2018

Related U.S. Application Data

(63) Continuation of application No. 14/865,140, filed on Sep. 25, 2015, now Pat. No. 9,979,717.

(51) Int. Cl.
| | |
|---|---|
| *H04L 29/06* | (2006.01) |
| *H04L 29/08* | (2006.01) |
| *H04L 9/32* | (2006.01) |
| *G06F 16/957* | (2019.01) |
| *H04L 9/08* | (2006.01) |

(52) U.S. Cl.
CPC .......... *H04L 63/083* (2013.01); *G06F 16/957* (2019.01); *H04L 9/0822* (2013.01); *H04L 9/0894* (2013.01); *H04L 9/32* (2013.01); *H04L 63/06* (2013.01); *H04L 63/1466* (2013.01); *H04L 67/02* (2013.01); *H04L 67/146* (2013.01)

(58) Field of Classification Search
CPC ........................... H04L 63/083; H04L 9/0822
USPC .......................................................... 713/168
See application file for complete search history.

(56) References Cited

U.S. PATENT DOCUMENTS

| | | | |
|---|---|---|---|
| 9,374,369 B2 | 6/2016 | Mahaffey et al. | |
| 2010/0211796 A1 | 8/2010 | Gailey et al. | |
| 2011/0138177 A1* | 6/2011 | Qiu | H04L 9/006 |
| | | | 713/168 |

(Continued)

OTHER PUBLICATIONS

United States Patent and Trademark Office, "Notice of Allowance," issued in connection with U.S. Appl. No. 14/865,140, dated Jan. 10, 2018, 9 pages.

(Continued)

*Primary Examiner* — Longbit Chai
(74) *Attorney, Agent, or Firm* — Hanley, Flight & Zimmerman, LLC

(57) ABSTRACT

A disclosed example to batch replace credentials for multiple websites includes accessing mappings between first encrypted credentials and corresponding ones of the websites; decrypting the first encrypted credentials using a master key to generate a plurality of first decrypted credentials; providing ones of the first decrypted credentials and corresponding ones of second decrypted credentials to corresponding ones of the websites to batch replace the first decrypted credentials with the corresponding ones of the second decrypted credentials at the corresponding ones of the websites; generating second encrypted credentials by encrypting the second decrypted credentials using the master key; and storing the second encrypted credentials in a database.

20 Claims, 8 Drawing Sheets

(56) References Cited

U.S. PATENT DOCUMENTS

| | | | |
|---|---|---|---|
| 2011/0184813 A1* | 7/2011 | Barnes | G06F 16/9535 |
| | | | 705/14.66 |
| 2012/0265989 A1 | 10/2012 | Lee et al. | |
| 2013/0254855 A1 | 9/2013 | Walters et al. | |
| 2014/0075555 A1 | 3/2014 | Shilimkar | |
| 2015/0058923 A1 | 2/2015 | Rajagopal et al. | |
| 2017/0024743 A1* | 1/2017 | Fogel | G06Q 20/4014 |
| 2017/0093839 A1 | 3/2017 | Whiteside et al. | |

OTHER PUBLICATIONS

United States Patent and Trademark Office, "Final Office Action," issued in connection with U.S. Appl. No. 14/865,140, dated Sep. 18, 2017, 10 pages.

United States Patent and Trademark Office, "Non-final Office Action," issued in connection with U.S. Appl. No. 14/865,140, dated Apr. 19, 2017, 9 pages.

International Searching Authority, "International Search Report and Written Opinion," issued in connection with International Patent Application No. PCT/US2016/053146, dated Jan. 12, 2017, 15 pages.

International Bureau, "International Preliminary Report on Patentablity," issued in connection with International Patent Application No. PCT/US2016/053146, dated Apr. 5, 2018, 12 pages.

* cited by examiner

ALGORITHM HARDENING IN BACKGROUND CONTEXT AND EXTERNAL FROM THE BROWSER TO PREVENT MALICIOUS INTERVENTION WITH THE BROWSER

TECHNICAL FIELD

Embodiments described herein generally relate to network-based browser credential authentication and more specifically to a system and methods to provide secure credential authentication to browsers, while protecting against malicious listening software.

BACKGROUND ART

Traditionally, authentication to a web service is accessed through a web portal. Commonly, the portal is accessed through the user directing a web browser to a web portal via a Uniform Resource Locator (URL), which is a representation of the web portal address, usually in a more human readable form.

Authentication for the web portal usually takes the approach of requiring the user to input a unique combination of a username and a password that identifies that specific user. The web portal usually prompts the user for submission of these credentials in a web-based form. The web-based forms present themselves under standards-based web browser renderable code. The credentials are usually input into the web browser, utilizing special policy requirements that determine the number and type of characters required to access that web service. Longer alphanumeric character strings usually provide stronger defense against brute force computational attacks.

Because the HyperText Transport Protocol (HTTP) is stateless, a user going from page to page in a web site would be treated as a completely new user if there were no way to keep track of such movement. Session cookies enable web sites to keep track of the user's movement so that the user is not asked to reenter information already given to the web site. A common use of such cookies is for remembering selections from online catalogs, so that a shopping cart functionality can maintain items previously placed in the cart. Unlike persistent cookies, which stay stored on the user's computer after a browser session ends, session cookies are temporary files that are erased upon existing the browser.

Session cookies, which are created after login to a web page completes, typically identify the user, as well as other pertinent information about a browser session, such as a time stamp. Session cookies include hashes of the important login information without the actual sensitive information, such as the text of a password. One useful feature of a session cookie is that the session cookie provides all that is needed to login to a web page, without having to re-enter the login credentials.

Existing credential manager software typically allows a user to register credentials for logging into a web site with the credential manager. Upon accessing the relevant web page, the credential manager injects the credentials into the web authentication form, using an application programming interface (API) and software development kit (SDK) tools provided by the browser. The injection is typically done in the form of a content script, typically JavaScript code, that is injected into the web page by the credential manager browser extension. The content script runs in the user's browser, and fills in the web form, including possibly automatically submitting the form back to the web site for completing the login.

There are also malicious programs that can detect when password information has been injected into the appropriate field of a login page. This malware may be listening to user entry of login information or for injection of credentials by the credential manager.

DESCRIPTION OF EMBODIMENTS

Figure 1:
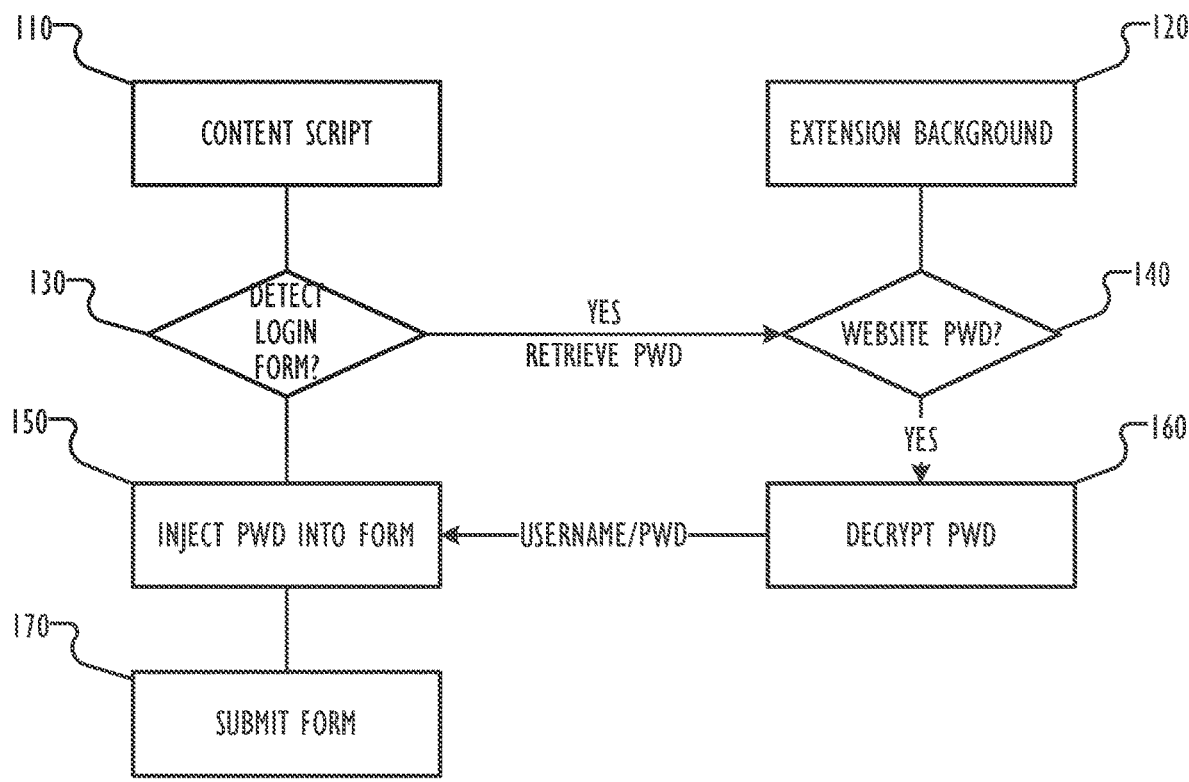
FIG. 1 is an activity diagram illustrating the actors and their activities in using a credential manager to login to a web page according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, the term "computer" should be understood as including any form of programmable device, including mobile devices.

The term "machine readable medium" can refer to a single physical medium or a collection of physical media that together store data or instructions described as being stored on the medium.

Although described herein in terms of a browser, an application for retrieving, presenting, and traversing information resources on the World Wide Web, the described techniques may be used in any application that manages user credentials and allows secure provision of those credentials for authentication purposes, and the term browser may be considered representative of all such applications.

Although described below in terms of software modules and algorithms, all or any desired portion of the techniques may be implemented in hardware, software, or firmware, or any combination thereof.

One of the more common modern methods of providing user credentials is via a web form presented in a web browser. Traditionally web browsers are applications that allow the user to view a representation of data presented in a specific standards-based syntax, the HyperText Markup Language (HTML). This allows users to view web sites for a variety of uses. The front end or "head" of a web browser is its user interface. The user interface is the main point at which the user provides input to the application, and is typically a graphical user interface (GUI). The rendering of the user interface is usually provided using common APIs provided by the display functionality of an operating system (OS) controlling the computer. This allows common appearances to be shared across applications executing under that OS, reducing code redundancy and bloat. Although described in terms of HTML and web pages, the techniques described herein can be used in any environment in which content may be injected into an object that provides a form for requesting credentials.

A "headless" or non-rendered browser is an application that does not employ a GUI, thus, for example, a web page processed by the non-rendered browser is not rendered or displayed. The headless browser may contain the functionality to use a GUI, even though a particular invocation may not use the GUI. A non-rendered application may be invisible to the inexperienced user while executing in the system. The backend of the application remains intact, and still operable to process web site data identically as the rendered application. Headless browsers provide automated control of a web page in an environment similar to popular web browsers, but are typically executed via a command line interface or using network communication. Some headless browsers may be special purpose applications designed for such automated control purposes.

FIG. 1 is flowchart illustrating the actors and their activities in using a credential manager to login to a web page according to one embodiment.

The two actors of this activity diagram are the content script 110 and the extension background 120. Both run in the user's browser. The content script 110 monitors the content of the webpage being processed by the user's browser, and provides the functionality for injecting credentials provided by the extension background into forms identified on the web page. The extension background 120 provides the interface for credential lookup and storage.

The content script 110 is utilized primarily for the detection of a login form in block 130. The detection of the login form may be implemented by a parser capable of parsing HTML. In some instances, no parsing is necessary, and form information may be provided to the content script by the credential manager. If the content script 110 is able to detect a login form in block 130, the content script 110 sends a request for the user credentials associated with that particular web site.

The extension background 120 receives the request from the content script 110, and determines if the system contains the web site's credentials in block 140. As illustrated in FIG. 1, the assumption is made that user credentials for that web site have been generated and stored by the credential manager. If not additional processing may be required for obtaining the credentials from the user and storing them. In one embodiment, the extension background may employ a database lookup based on identification details of a web site used as a lookup key in an encrypted credential database. If the query returns a result based on the web site lookup key, the credentials are returned from the query. These credentials may include any or all of a password, user name or userid, and any other desired credential information, such as account numbers. The database may be local to the user's computer or a remote database accessed by a network interface. Although described as a database, no particular form of storage is to be implied by the use of that term. The database may be implemented using any type of database technology, including as a collection of individual files.

Upon extracting a credential, the extension background 120 then decrypts the credential in block 160, typically using a master password or other special credential requested from and provided by the user, but not stored by credential manager in clear text. Each entry in the database is preferably encrypted using the special credential, so that even the possessor of the database would not be able to decrypt the credential data without the special credential. The encryption techniques used for this purpose are outside the scope of this disclosure and are not further described herein.

The extension background 120 then provides the decrypted credentials in a response to the content script 110. As the content script 110 is operable to parse web-form code, it is operable to inject the credentials into the web-form in block 150.

Finally, the content script 110 with the inclusion of the credentials can submit the form in block 170 to the web site. This action is akin to the user clicking the "Submit" or "Login" button on the user interface of a web login form.

Because the extension background 120 typically runs in a more secure area of memory, based on the integrity model used by the browser's extension API, the extension background processing portion 120 of FIG. 1 is secure. In some embodiments, by using encrypted communication between the extension background 120 and the content script 110, that communication can be further secured. After logout, memory that may have contained sensitive information can be securely cleared, as well.

However, if the content script 110 executes in the user's browser, malware running on the user's computer may be able to intercept the injection of the credentials into the form, thus making the credentials available to the malware in their decrypted form, and destroying the security of the credentials. This malware may take various forms, including keyloggers or malicious browser extensions that may have access to the memory space used by other browser extensions.

By moving the processing of critical user authentication into a non-rendered application running without extensions in a different context, with direct injection of password credentials into non-rendered applications, credential authentication can be further hardened.

Figure 2:
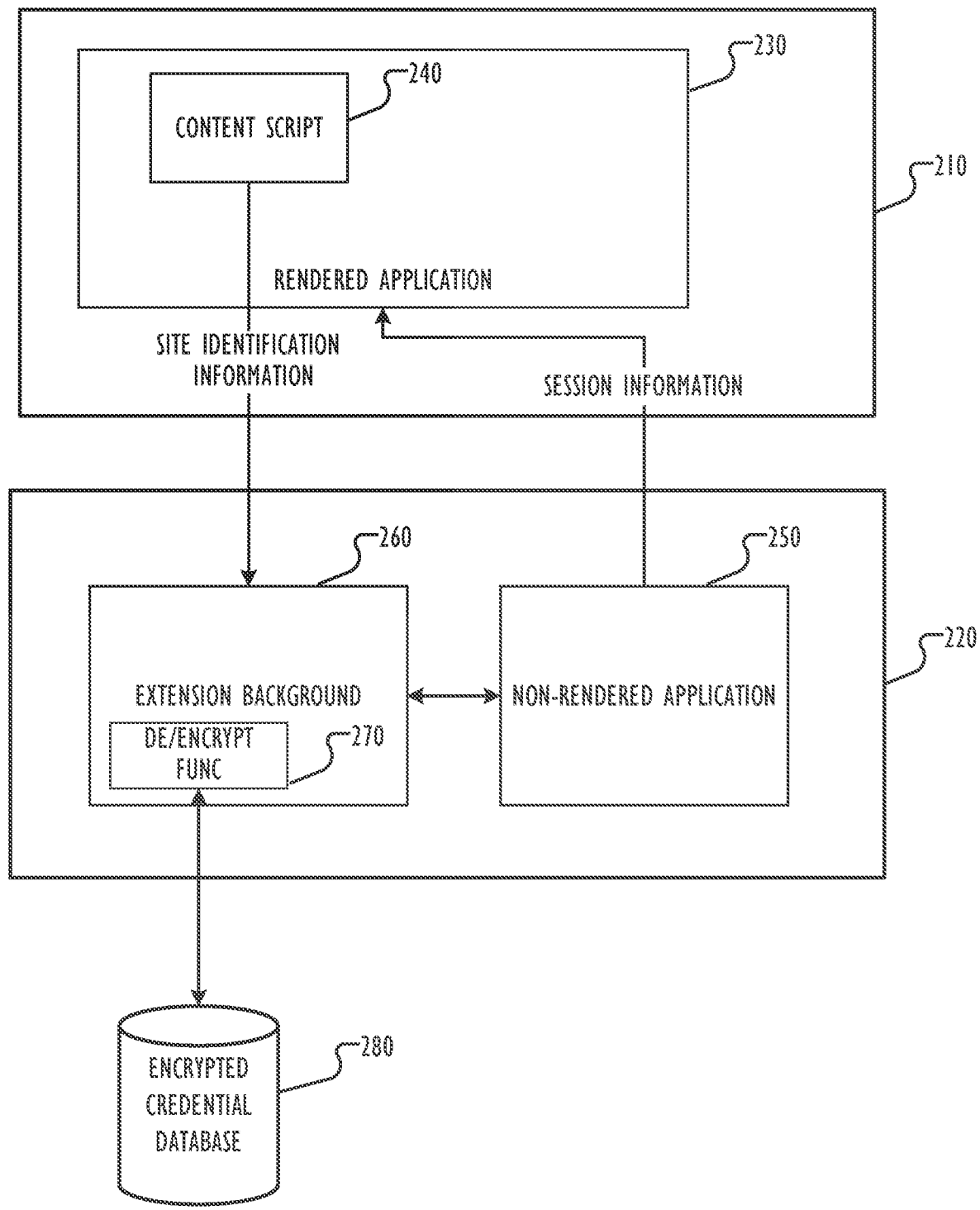
FIG. 2 is a block diagram illustrating a system operable to generate an authentication session cookie within a non-rendered application according to one embodiment.

FIG. 2 is a block diagram representing an embodiment of a system operable to authenticate a user securely utilizing a non-rendered application, typically a headless browser, executing in a different context without extensions, avoiding the risks that malware may intercept decrypted credentials injected by the content script 110.

A rendered application 230 is identified as an entry point for the user experience. Generally, this is a web browser, but is not limited as such, as the inclusion of web-based authentication procedures may be embedded into other applications, using published libraries and application interfaces. In a common use case, the rendered application 230 utilizes a web browser to access a web portal.

Within the rendered application 230, a content script 240 monitors the content of the web page. The purpose of the content script 240 is to detect and monitor for forms in which credentials are to be injected, such as forms that contain prompts for user names and passwords. Upon the detection of a credential request form, the content script 240 transmits site identification information corresponding to the web page to the extension background 260.

The extension background 260 executes in a different context 220 from the user environment in which the rendered application 230 executes. The context 220 is typically protected based on the browser extension API and security model. The extension background 260 interfaces with an encrypted credential database 280 through a defined API. The encrypted credential database 280 contains information related to user credentials associated with various web sites. A query based on a key value derived from the web site details yields credentials if present, or an indication that credentials for that web site are not present in the encrypted credential database 280. In one embodiment, the context 220 may be implemented and executed in a cryptographically protected Trusted Execution Environment (TEE).

The credential manager also controls the instantiation of a non-rendered application 250, typically a headless browser. As illustrated in FIG. 2, the non-rendered application 250 also executes within the context 220, but embodiments may execute in a different context from the context 220. The non-rendered application 250 is provided the web site information, as well as the credentials retrieved from the encrypted credential database 280. The non-rendered application is not instantiated in a manner in which the user can perceive. The non-rendered application 250 acts and responds like the rendered application 230 and generates identical outputs. The outputs of the non-rendered application 250 are consumable by the rendered application 230 and are indistinguishable to the output that the rendered application 230 would itself output or input. Because the extension background 260 and the non-rendered application 250 in a different context than the rendered application 230, malware such as malicious browser extensions will be unable to intercept the communication of the credentials from the extension background 260 to the non-rendered application 250, the credentials or the injection by the non-rendered application into forms on a web page at the web site that was originally seen by the rendered application 230 in the user environment 210.

The credential manager can request the master key or password from the user, which can be used by encryption/decryption functionality 270 to decrypt or encrypt the credentials extracted from or saved to the credential database 280. Typically, this is done when the user logs in to the credential manager, but may be performed at other times. Because the credential manager runs in a different context than the user browser, the user's entry of the master password is protected from interception by malware running in that context, such as malicious browser extensions. Typically, the encrypted credential database 280 employs a symmetric encryption algorithm using the master key as the encryption key for encrypting and decrypting credentials, but any desired encryption and decryption technique may be used, including asymmetric encryption techniques.

In this embodiment, the output for the non-rendered application 250 is a session cookie file, created after the credentials are decrypted by the extension background 260, sent to the non-rendered application 250, and injected by a content script executed by the non-rendered application 250 to complete the login to the desired web site. As described above, the session cookie file contains information relating to the login session, including typically a hash of sensitive credential information, therefore, protecting against other nefarious applications that might snoop session cookies.

The non-rendered application 250 provides the output session cookie file to the rendered application 230 in user environment 210. The rendered application 230 utilizes the session cookie file as if it was internally generated by user interaction and login, allowing the user to continue the session initially created with the web site by the non-rendered application 250. This allows the user to access the credential-protected web site, without revealing the user credentials in the user environment 210. Although malware running on the user's computer might be able to obtain the session cookie, the value of the session cookie is limited, in part because of its temporary existence, deleted upon logout from the web page, as well as because the underlying credentials have not been exposed.

In some embodiments, the user environment 210, the context 220, and the encrypted credential database 280 may be provided on any number of combinations of physical devices attached by networking technologies. In another embodiment, some or all of these elements may be provided on same device, communicating via inter-process messaging or well-defined APIs.

Although as described above the user's web browser initiates the procedure by visiting a web page, embodiments may allow the user to request the credential manager to cause a login to the web page without the user first visiting the web page. In such embodiments, the non-rendered application 250 may use stored information about the target web page instead of parsing the web page and detecting the presence and location of the login form. In addition, although described herein as a login, embodiments may use the same or similar techniques for allowing the credential manager to fill other sensitive types of forms, such as forms requesting credit card information.

Figure 3:
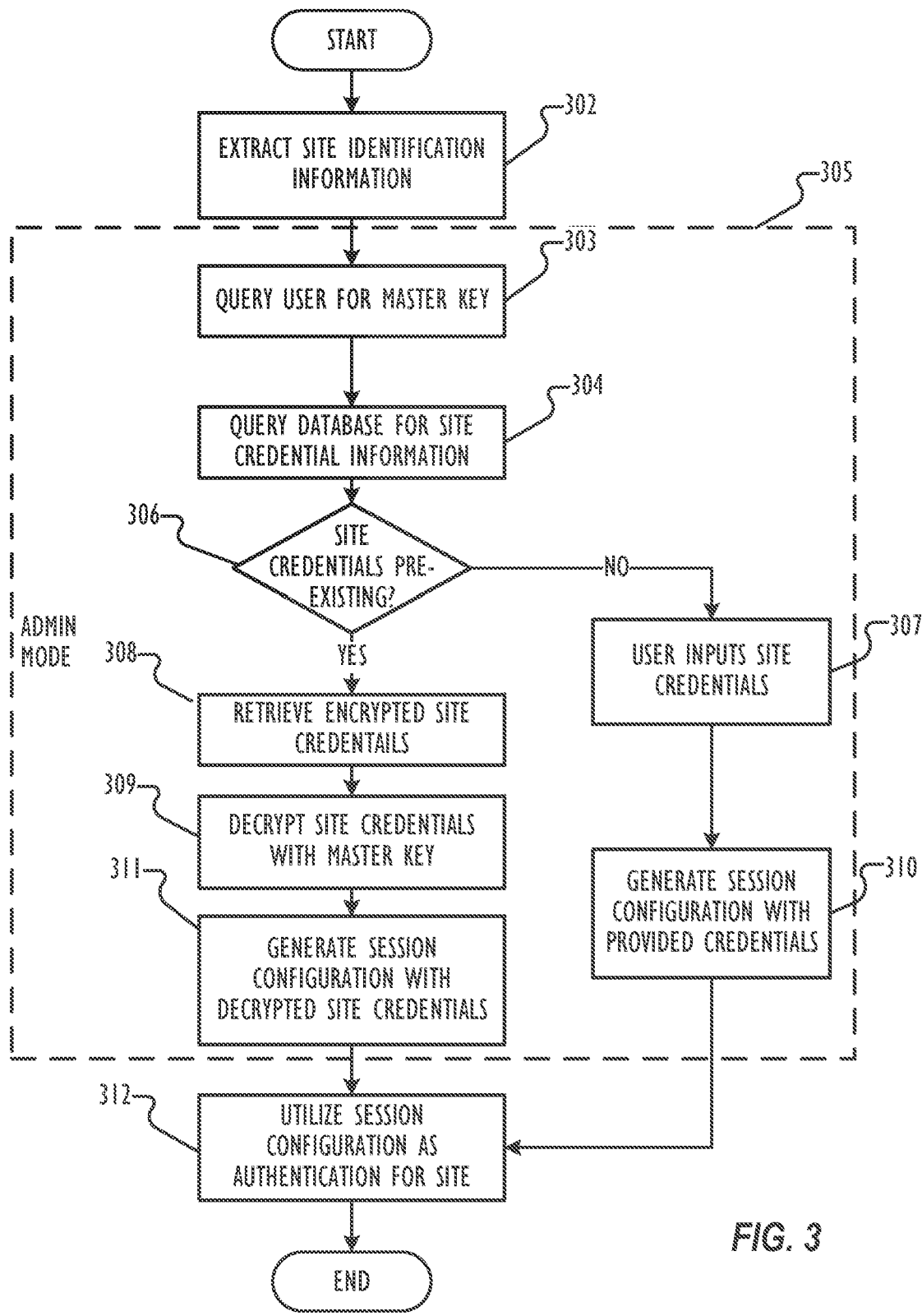
FIG. 3 is a flowchart illustrating a technique for securely authenticating a user according to one embodiment.

FIG. 3 is a flow diagram demonstrating the steps for securely authenticating user credentials utilizing a non-rendered application.

Any given numbers of actors can perform the actions of this process. In one embodiment, a single user in the traditional use case may perform all the actions. In other embodiments, portions of the actions may be performed by other actors. In particular, some embodiments may use a remote credentials database 280 provided by a credentials management service, thus network communication may be involved between the extension background 260 and the credentials database 280.

The process extracts web site identification information at block 302. The mechanism for extracting this information resides within the scope of the application rendering the web site for the user. The information extracted may include, but is not limited to site URLs, Internet Protocol (IP) addresses, and metadata included in the web site's retrieved code. The information extracted should provide a unique mapping between the web site and the user credentials sought.

For protection of the credentials handling process, an environment 305 other than the context 210 of the rendered application 230 (indicated in FIG. 3 by a dashed line) is used for many of the following actions. This environment may be as simple as execution of the actions by software running in a different context from the context 210, but may also be provided by performing the actions in a TEE or secure enclave, if desired.

At block 303, a user is requested to provide a master key that is used for encryption and decryption only. The master key is not stored with the credentials or in the credentials database 280. Utilizing the master key, which is only in the possession of the user, the credentials remain private. The credentials are independently encrypted for remote storage, prior to transmission to the database, as well decrypted after transmission from the database as described above. Although illustrated in FIG. 3 as occurring at the time of performing the user authentication for the current website, the master key may instead be requested at an earlier time, such as at a login of the user into the credential manager or at a previous authentication of the user to another web site.

The extracted web site identification information is utilized in block 306 to query credentials in the encrypted credentials database 280 at block 304 for the indicated web site. This also has the advantageous effect of verifying a web site's authenticity versus known web sites to avoid providing credentials to a "spoofed" web site.

If the user credentials are found in the database 280, or are not retrievable for some reason (e.g., the database 280 is remote to the user's computer and is currently inaccessible for some reason), the execution background environment may request the credentials from the user in block 307, allowing secure entry of the credentials. A headless browser is then instantiated as the non-rendered application 250 for using the credentials to login to the web site and begin a session with that web site, invisibly to the user.

As illustrated in FIG. 3, credentials extracted from the credentials database 280 or supplied by the user in block 307 are accepted by the web site. Although not illustrated by FIG. 3, one of skill in the art will recognize that error handling actions may be required if the credentials are not accepted, such as may happen if credentials have expired or if the content script executed by the headless browser 250 does not match the form used by the web site. Such error handling actions may involve re-querying the user to obtain the proper credentials, or any other action as desired, including aborting the attempt to access the web site.

At block 310, once the credentials have been provided by the user and a session with the web site established using those credentials, the headless browser or other non-rendered application generates a session cookie detailing the session configuration. The session cookie is then passed back for use in continuing the authenticated session by the user's browser or other rendering application block 312.

If the credentials for the specified site are retrievable from the credentials database 280, the encrypted user credentials are retrieved at block 308. At block 309, the credentials may be decrypted with the master key into the original human readable form. However, security of the credentials remain intact, as the decryption is taking place in within the environment 305.

Once the credentials have been received and decrypted, the credentials are provided to the non-rendering application 250 for use in authenticating the user to the web site. Subsequently at block 311, the non-rendering application generates a session cookie detailing the session configuration. As described previously, the session cookie is then passed back to the user's browser or other rendered application in block 312 for use in continuing the session with the web site in that application.

Upon the generation of the session configuration file, the user credentials may be securely discarded and the non-rendered application terminated, leaving the session configuration file, which is usable for continued access of the web site for that session only.

Figure 4:
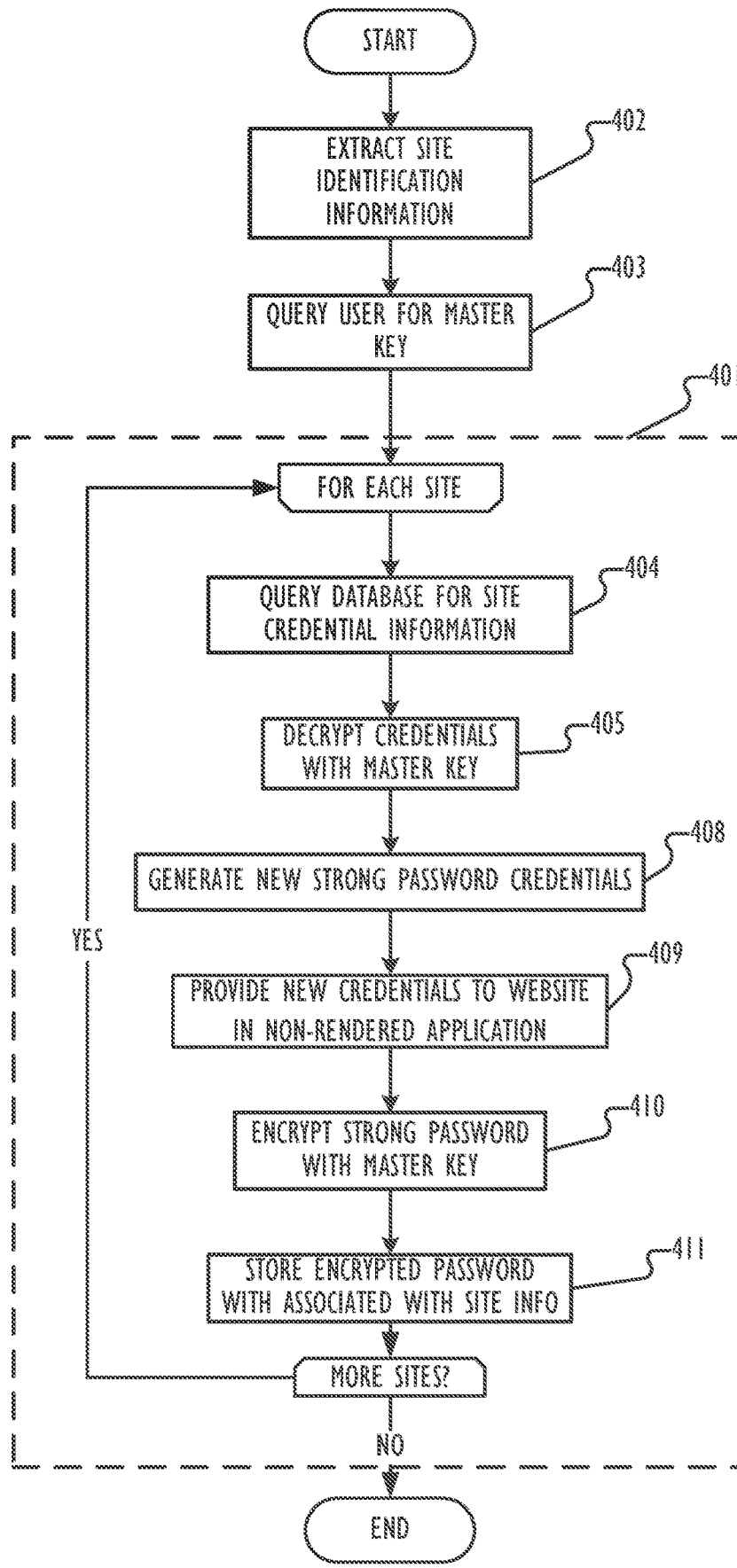
FIG. 4 is a flowchart illustrating a technique for strong password reset according to another embodiment.

Although described above as a technique for securely accessing a web site, similar functionality may be provided for securely modifying or resetting user credentials. As is commonly known, individual web sites may require that credentials be reset from time to time. In addition, users may wish to reset multiple credentials. One advantage of a system as described herein is that the credential manager may allow a user to generate new credentials for multiple sites without having the user specify or even know the new credentials, much less have to login to the various sites manually. FIG. 4 is a flow diagram illustrating a set of actions for securely resetting a plurality of user credentials utilizing a non-rendered application according to one embodiment.

The process extracts web site identification information at block 402. The mechanism for extracting this information resides within the scope of the application rendering the web site for the user. This information may include but is not limited to site URLs, IP addresses, and metadata included in the web site's retrieved code. The information extracted should provide a unique mapping between the web site and the user credentials sought. In some embodiments, this may involve presenting a list of available web sites for which credentials exist and asking the user to select which web sites' credentials should be reset. Other embodiments may allow the user to indicate that all credentials are to be reset without having to indicate specific web sites or credentials to reset. Some embodiments may limit the number of credentials that can be reset in a single operation. Although described in terms of a plurality of credentials, the same technique may be used for resetting a single credential. Although the most common scenario involves resetting passwords, non-password credentials may be reset or changed using the disclosed techniques.

A user is requested to provide the master key at block 403 that is used for encryption and decryption of credentials stored in the credential database 280. As described above, the master key is not stored with the credentials or in the database, allowing the database to be hosted remotely if desired.

In block 404, the credentials are extracted from the database 280 for one of the web sites whose credentials are to be reset. These credentials are then decrypted in block 405 using the master key.

With the decrypted pre-existing credentials, new strong credentials can be generated at block 408. Different web sites may have different credential criteria that limit what credentials are acceptable to that site. In some embodiments, the credential management system may store information about credential criteria for the web sites in the credential database 280. Other embodiments may keep track of credential criteria outside the credential database 280. Common credential criteria include but are not limited to minimum length and requirements for specific character groups, such as requiring a minimum number of numeric or special characters, and changes in character case. Other credential criteria may be used by web sites and are outside the control of the credential management system.

The existing credentials and the newly generated credentials may then be provided to the corresponding web site in block 409, using a non-rendered application such as a headless browser to preserve the security of the newly generated credentials. The non-rendered application uses a content script for the specific web site to allow injection of old and new credentials into the form provided by the web site for credential resetting. In some embodiments, the non-rendered application may need to be able to inject the old credentials into one form and the new credentials into another form. Because the non-rendered application executes in the separate context 401, as described above, the injection process is secure from malware that may attempt to intercept such transactions in an ordinary browser.

The newly generated credentials may then be encrypted using the master key in block 410. Once the credentials have been encrypted, they are stored in block 411 in the encrypted credential database 280, along with the site identification information.

Blocks 404-411 are performed for each web site whose credentials are to be reset. While performing these actions on the user's computer may be acceptable in some scenarios, such as where only a small number of credentials are to be reset, the procedure could take a significant amount of time where multiple credentials are to be reset. That time may be unacceptable to the user, who may be required to wait until the procedure completes before proceeding on with other tasks. A more preferable approach may be to push some of the password reset procedure off to a remote process that an act on behalf of the user without tying up the user's computer.

Figure 5:
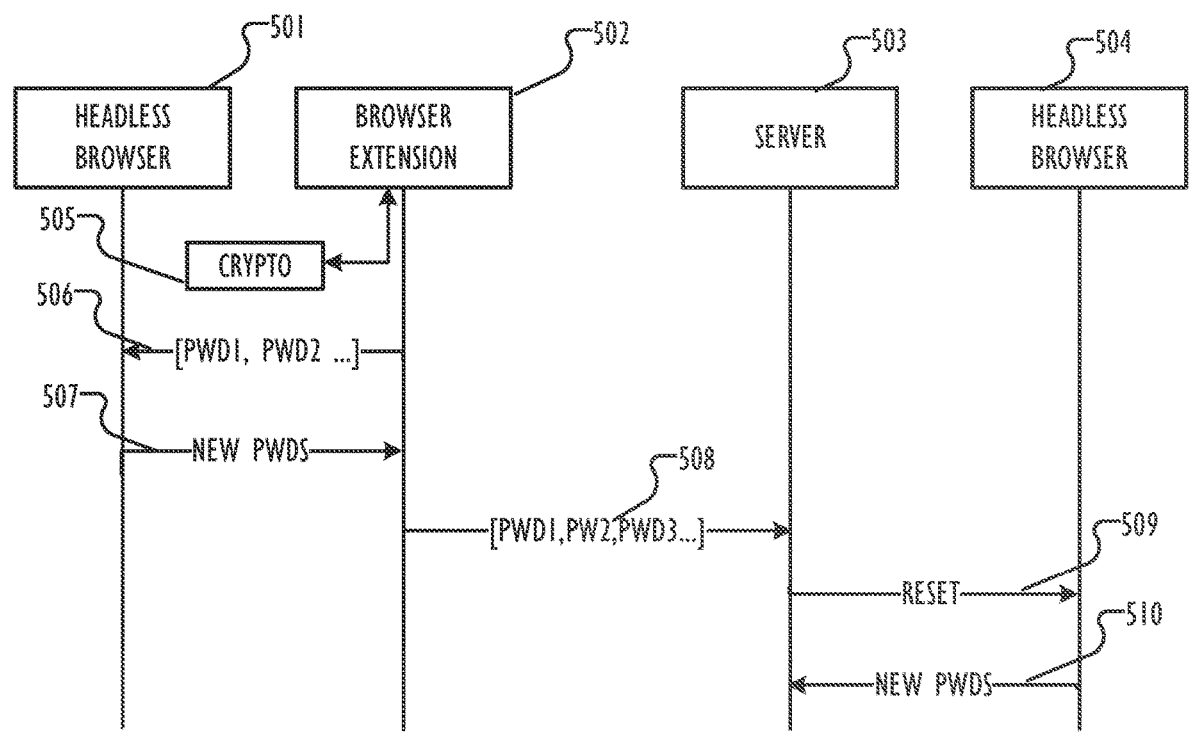
FIG. 5 is an activity diagram illustrating the actors and their activities in a password reset operation according to one embodiment.

FIG. 5 is an activity diagram illustrating the actors and their activities in a credential reset procedure according to two embodiments.

The browser extension 502 is the initializing actor in both embodiments, receiving instructions from the user to reset credentials. The extension 502 utilizes a decryption module 505 to decrypt encrypted user credentials obtained from the credential database 280.

After obtaining credentials from the decryption module 505, the extension background 502 starts a headless browser 501 process. The headless browser 501 receives from the extension background 502 a credentials list 506 for the various associated web sites whose credentials are to be reset. The headless browser 501 then generates new strong credentials 507 for those web sites and performs an appropriate content script to inject the old and new credentials into the credential reset form, causing the web site to perform the credential reset. The new credentials 507 are then transferred back to the parent process, the extension background 502, which can then store the new credentials in the credentials database 280.

As indicate above, however, this embodiment may be less preferable to a user, particularly where a large number of credentials are to be reset, because of the delays inherent in each credential reset operation at the corresponding web site. FIG. 5 also illustrates an embodiment in which the credential reset operations are pushed to a remote device to perform.

In this embodiment, the credentials 508 are forwarded from the background extension 502 to a server 503. Because the credentials are about to be reset, this transfer of the credentials may be in the clear, although embodiments may re-encrypt the credentials 508 for purposes of this transfer across one or more networks to the server 503. The server 503 may be implemented anywhere that is convenient, including at a network-connected service provider, such as the service provider that hosts the credentials database 280.

At the server 503, reset commands 509 are issued for the web sites that have credentials presented. Similar to the previous embodiment, the reset commands 509, including the old credentials 508 are sent to a headless browser 504 that acts on the user's behalf to inject the old and new credentials 510 into the appropriate credential reset form of the web site. Also similarly, the new credentials may be generated by the headless browser 504 as part of the reset procedure. The new credentials 510 may then be presented back to the server 503 and forwarded to the browser extension 502. Typically, the new credentials are encrypted by the headless browser 504 using an encryption key known to the browser extension 502, allowing them to be securely transmitted to the browser extension 502. The browser extension 502 may then decrypt the new credentials and re-encrypt them with the master key in the cryptographic module 505, before storing the encrypted new credentials 510 in the credentials database 280. In some embodiments, instead of forwarding the new credentials via the server 503, the new credentials may be sent directly from the headless browser 504 to the browser extension 502. Variants of the procedure described above may be employed, adding additional encryption and decryption steps, such as encrypting the new credentials 510 in the path between the headless browser 504 and the server 503 with one encryption technique or key, and encrypting the new credentials 510 with a different key or technique in the server 503 before forward them to the browser extension 502.

Figure 6:
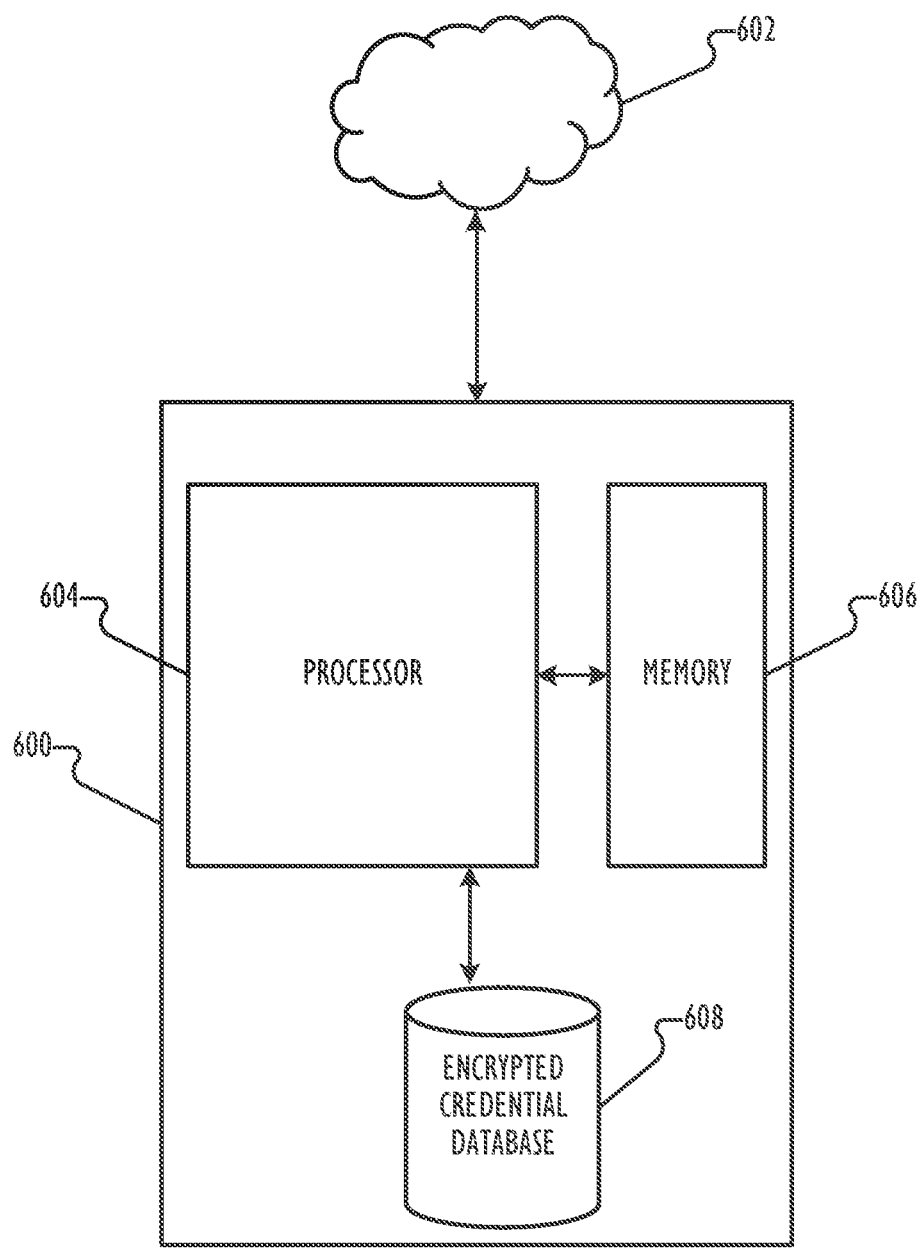
FIG. 6 is a block diagram illustrating components of a system for the hardening of user credential entry according to one embodiment.

FIG. 6 is a block diagram illustrating at least some of the components of a credential management system according to one embodiment.

An apparatus 600 for the hardening of user credential entry and reset comprises a processor 604, a memory 606, and an encrypted credential database 608, corresponding to the credential database 280 described above. Other common elements of computers and other programmable devices may be provided as desired, and any desired technique used to connect the various elements illustrated in FIG. 6.

The processor 604 provides the computational resources for processing the various actions described above, including the encryption and decryption of data. Software is stored as instructions on the memory 606. When executed those instructions cause the processor to instantiate elements such as the non-rendered application and the user's browser and perform the techniques described above. Although a single one of each element is illustrated in FIG. 6, any desired number of each element may be provided and used.

Coupled to the processor 604, is an encrypted credential database 608. The encrypted credential database comprises the relevant web site metadata as well as the user's credentials internally. In this embodiment, the encrypted credential database 608 is internal to the apparatus, however, in other embodiments, the encrypted credential database 608 may be communicatively coupled to the apparatus 600 via network 602 and provided by another computer, such as a server maintained by a credentials management service (not illustrated). Although only a single network 602 is illustrated in FIG. 6, any number of interconnected networks may be employed.

Coupled to the apparatus 600, is network 602. The network 602 is operable to host web site code and provide them to the apparatus in a standards-based parse-able grammar. In most embodiments, this network 602 is synonymous with the world wide web; however, intranets and other networks are applicable as well.

Figure 7:
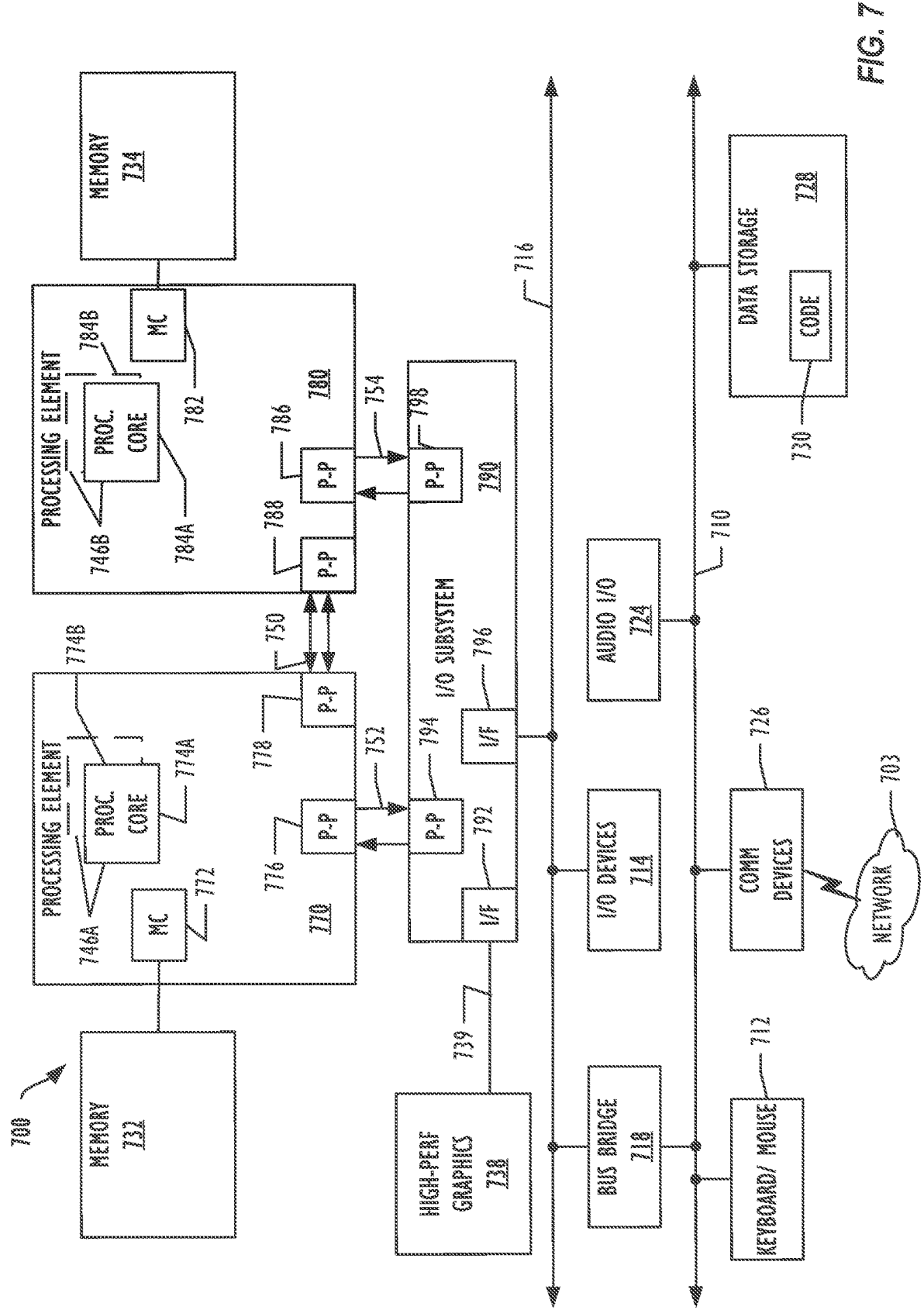
FIGS. 7-8 are block diagrams illustrating programmable devices that may be used to implement the techniques described herein.

Referring now to FIG. 7, a block diagram illustrates a programmable device 700 that may be used for implementing the techniques described above in accordance with one embodiment. The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute instruction code in a manner similar to that discussed above in connection with FIGS. 1-3. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746a, 746b may store data (e.g., instructions) that are utilized by one or more components of the processing element, such as the cores 774a, 774b and 784a, 784b, respectively. For example, the shared cache may locally cache data stored in a memory 732, 734 for faster access by components of the processing elements 870, 880. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to first link 716, along with a bridge 718 that may couple first link 716 to a second link 720. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
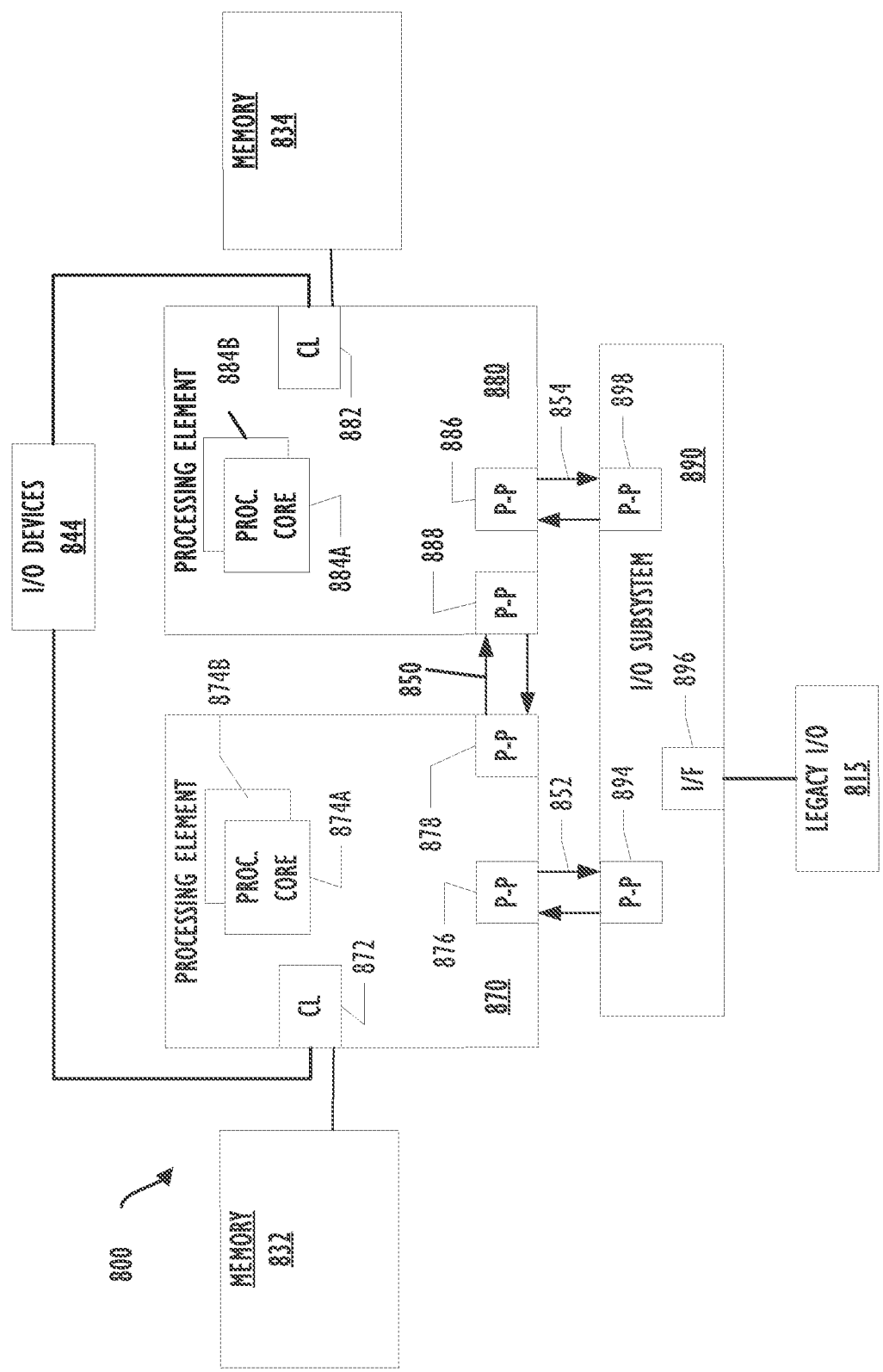

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 8. In addition, CL 872, 882 may also include I/O control logic. FIG. 8 illustrates that not only may the memories 832, 834 be coupled to the 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

The following examples pertain to further embodiments.

Example 1 is a system for managing user credentials, comprising: one or more processors; memory coupled to the one or more processors on which are stored instructions, comprising instructions that when executed cause at least some of the one or more processors to: perform user authentication to a web site in a non-rendered application, establishing a session with the web site; generate a session configuration data by the non-rendered application; send the session configuration data to a rendering application; and use the session configuration data by the rendering application, transferring the session to the rendering application.

In Example 2 the subject matter of Example 1 optionally includes wherein the rendering application is a web browser and the non-rendered application is a headless browser.

In Example 3 the subject matter of Example 1 optionally includes wherein instructions that when executed cause at least some of the one or more processors to perform user authentication to the web site in a non-rendered application comprise instructions that when executed cause at least some of the one or more processors to: detect user authentication prompts by a web site in a rendering application.

In Example 5 the subject matter of Example 6 optionally includes wherein the new credentials received from the server are encrypted and wherein the instructions further comprise instructions that when executed cause at least some of the one or more processors to: decrypt the new credentials; and re-encrypt the new credentials with a master key unknown to the server; and store the encrypted new credentials in a credentials database.

Example 8 is a machine readable medium, on which are stored instructions for managing user credentials, comprising instructions that when executed cause a machine to: obtain credentials by an extension background module from a credentials database; decrypt the credentials and pass the decrypted credentials to a non-rendered application; establish by the non-rendered application a session for a user at a web site using the decrypted credentials; and pass information about the session to a browser, the information sufficient to allow the browser to continue the session established by the non-rendered application.

In Example 9 the subject matter of Example 8 optionally includes wherein the information about the session comprises a session cookie generated by the non-rendered application.

In Example 10 the subject matter of Example 8 optionally includes wherein the instructions that when executed cause the machine to decrypt the credentials comprises instructions that when executed cause the machine to: request a master key from the user by the extension background module; and decrypt the credentials by the extension background module using the master key.

In Example 13 the subject matter of Example 15 optionally includes wherein the new credentials are received from a headless browser instantiated to reset the credentials for the user at the web site.

In Example 17 the subject matter of Example 15 optionally includes wherein the instructions further comprise instructions that when executed cause the machine to: replace the current credentials with the new credentials in the credentials database.

Example 18 is a method for securely managing credentials, comprising: obtaining credentials for a web site from a credentials database by an extension background module; establishing a session for a user using the credentials by a non-rendered application; providing session information from the non-rendered application to a rendered application; and continuing the session with the web site in the rendered application.

In Example 19 the subject matter of Example 18 optionally includes wherein the non-rendered application is a headless browser.

In Example 20 the subject matter of Example 18 optionally includes further comprising: identifying credentials for a web site to be reset; sending the credentials to a server configured to reset the credentials on behalf of the user; receiving new credentials for the web site; and replacing the credentials for the web site to be reset with the new credentials in the credentials database.

In Example 21 the subject matter of Example 18 optionally includes where obtaining credentials comprises: obtaining a master key; obtaining credentials from the credentials database; and decrypting the credentials obtained from the credentials database using the master key.

In Example 25 the subject matter of Example 26 is an apparatus comprising: a processor; and a memory coupled with the processor, on which are stored instructions, comprising instruction that when executed cause the processor to: obtain credentials by an extension background module from a credentials database; decrypt the credentials and pass the decrypted credentials to a non-rendered application; establish by the non-rendered application a session for a user at a web site using the decrypted credentials; and pass information about the session to a browser, the information sufficient to allow the browser to continue the session established by the non-rendered application.

In Example 27 the subject matter of Example 26 optionally includes wherein the information about the session comprises a session cookie generated by the non-rendered application.

In Example 28 the subject matter of Example 26 optionally includes wherein the instructions that when executed cause the machine to decrypt the credentials comprises instructions that when executed cause the processor to: request a master key from the user by the extension background module; and decrypt the credentials by the extension background module using the master key.

In Example 31 the subject matter of Example 33 optionally includes wherein the new credentials are received from a headless browser instantiated to reset the credentials for the user at the web site.

In Example 35 the subject matter of Example 33 optionally includes wherein the instructions further comprise instructions that when executed cause the processor to: replace the current credentials with the new credentials in the credentials database.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

RELATED APPLICATION

This patent arises from a continuation of U.S. patent application Ser. No. 14/865,140, which was filed on Sep. 25, 2015. U.S. patent application Ser. No. 14/865,140 is hereby incorporated herein by reference in its entirety.

What is claimed is:

1. An apparatus to batch replace credentials for multiple websites, the apparatus comprising:
   a hardware processor; and
   a memory including instructions that, when executed by the hardware processor, cause the hardware processor to:
      access mappings between first encrypted credentials and corresponding ones of the web sites;

decrypt the first encrypted credentials using a master key to generate a plurality of first decrypted credentials;

provide ones of the first decrypted credentials and corresponding ones of second decrypted credentials to corresponding ones of the websites to batch replace the first decrypted credentials with the corresponding ones of the second decrypted credentials at the corresponding ones of the websites, the second decrypted credentials for performing user authentications at the corresponding ones of the websites to establish authenticated sessions;

generate second encrypted credentials by encrypting the second decrypted credentials using the master key; and store the second encrypted credentials in a database.

2. The apparatus as defined in claim 1, wherein the instructions are to cause the hardware processor to access the mappings from website identification information that includes uniform resource locators of the websites.

3. The apparatus as defined in claim 1, wherein the instructions are to cause the hardware processor to provide the first and second decrypted credentials by providing the first and second decrypted credentials via a non-rendered application.

4. The apparatus as defined in claim 1, wherein the instructions are further to cause the hardware processor to generate the second decrypted credentials for the websites based on credential criteria for the corresponding ones of the websites, the credential criteria indicative of acceptable credential characteristics.

5. The apparatus as defined in claim 1, wherein the instructions are to cause the hardware processor to generate the second decrypted credentials for the websites at a user's computer.

6. The apparatus as defined in claim 1, wherein the instructions are further to cause the hardware processor to receive the master key via user input.

7. The apparatus as defined in claim 1, wherein the instructions are further to cause the hardware processor to access the first encrypted credentials from the database.

8. A storage device or storage disk comprising instructions that, when executed by a hardware processor, cause the hardware processor to at least:

access mappings between first encrypted credentials and corresponding ones of websites;

decrypt the first encrypted credentials using a master key to generate a plurality of first decrypted credentials;

provide ones of the first decrypted credentials and corresponding ones of second decrypted credentials to corresponding ones of the websites to batch replace the first decrypted credentials with the corresponding ones of the second decrypted credentials at the corresponding ones of the websites, the second decrypted credentials for performing user authentications at the corresponding ones of the websites to establish authenticated sessions;

generate second encrypted credentials by encrypting the second decrypted credentials using the master key; and store the second encrypted credentials in a database.

9. The storage device or storage disk as defined in claim 8, wherein the instructions are to cause the hardware processor to access the mappings from website identification information that includes uniform resource locators of the websites.

10. The storage device or storage disk as defined in claim 8, wherein the instructions are to cause the hardware processor to provide the first and second decrypted credentials by providing the first and second decrypted credentials via a non-rendered application.

11. The storage device or storage disk as defined in claim 8, wherein the instructions are further to cause the hardware processor to generate the second decrypted credentials for the websites based on credential criteria for the corresponding ones of the websites, the credential criteria indicative of acceptable credential characteristics.

12. The storage device or storage disk as defined in claim 8, wherein the instructions are to cause the hardware processor to generate the second decrypted credentials for the web sites at a user's computer.

13. The storage device or storage disk as defined in claim 8, wherein the instructions are further to cause the hardware processor to receive the master key via user input.

14. The storage device or storage disk as defined in claim 8, wherein the instructions are further to cause the hardware processor to access the first encrypted credentials from the database.

15. A method of batch replacing credentials for multiple websites, the method comprising:

accessing, by executing an instruction with a processor, mappings between first encrypted credentials and corresponding ones of the websites;

decrypting, by executing an instruction with the processor, the first encrypted credentials using a master key to generate a plurality of first decrypted credentials;

providing, by executing an instruction with the processor, ones of the first decrypted credentials and corresponding ones of second decrypted credentials to corresponding ones of the websites to batch replace the first decrypted credentials with the corresponding ones of the second decrypted credentials at the corresponding ones of the web sites, the second decrypted credentials for performing user authentications at the corresponding ones of the websites to establish authenticated sessions;

generating, by executing an instruction with the processor, second encrypted credentials by encrypting the second decrypted credentials using the master key; and storing, by executing an instruction with the processor, the second encrypted credentials in a database.

16. The method as defined in claim 15, wherein the accessing of the mappings includes accessing the mappings from website identification information that includes uniform resource locators of the web sites.

17. The method as defined in claim 15, wherein the providing of the first and second decrypted credentials includes providing the first and second decrypted credentials via a non-rendered application.

18. The method as defined in claim 15, further including generating the second decrypted credentials for the websites based on credential criteria for the corresponding ones of the websites, the credential criteria indicative of acceptable credential characteristics.

19. The method as defined in claim 15, further including generating the second decrypted credentials for the web sites at a user's computer.

20. The method as defined in claim 15, further including receiving the master key via user input.

* * * * *